US012415196B2

(12) United States Patent
Barratt et al.

(10) Patent No.: US 12,415,196 B2
(45) Date of Patent: Sep. 16, 2025

(54) BAG ON VALVE TECHNOLOGY

(71) Applicant: Simply Breathe Holdings Ltd, Beverley (GB)

(72) Inventors: Joe M. Barratt, Beverley (GB); Matthew J. Sygrove, Halifax (GB); Dominic C. Schiller, Birkenhead (GB); Thomas A. Ryan, Kelsall (GB)

(73) Assignee: Simply Breathe Holdings Limited (GB)

( * ) Notice: Subject to any disclaimer, the term of this patent is extended or adjusted under 35 U.S.C. 154(b) by 0 days.

(21) Appl. No.: 18/731,231

(22) Filed: May 31, 2024

(65) Prior Publication Data

US 2024/0316584 A1 Sep. 26, 2024

Related U.S. Application Data

(63) Continuation of application No. 17/263,544, filed as application No. PCT/IB2019/056330 on Jul. 24, 2019, now Pat. No. 12,023,703.

(30) Foreign Application Priority Data

Jul. 27, 2018 (GB) ..................................... 1812298

(51) Int. Cl.
*B05B 7/28* (2006.01)
*B05B 7/04* (2006.01)
(Continued)

(52) U.S. Cl.
CPC ................ *B05B 7/28* (2013.01); *B65D 83/32* (2013.01); *B65D 83/625* (2013.01); *B65D 83/66* (2013.01); *B05B 7/0483* (2013.01)

(58) Field of Classification Search
CPC ......... B05B 7/28; B05B 7/0483; B67D 83/32; B67D 83/625; B67D 83/66
See application file for complete search history.

(56) References Cited

U.S. PATENT DOCUMENTS 3,326,469 A 6/1967 Robert et al.
3,796,352 A * 3/1974 Morane .................. B65D 83/66 222/514
(Continued)

FOREIGN PATENT DOCUMENTS

AU 2769802 A 5/2002
DE 1817899 A1 7/1973
(Continued)

*Primary Examiner* — Jeremy Carroll
(74) *Attorney, Agent, or Firm* — Fishman Stewart PLLC

(57) ABSTRACT

A dispenser includes a dispenser container and a valve assembly including a valve connected to the dispenser container. The dispenser container is at least partially filled with activated carbon and/or another adsorbent and a dispensing carrier gas. An ingredient is contained in an ingredient containing reservoir. The valve assembly further includes an upper end of which is in operative communication with an actuator spray nozzle, and a lower end connected to the ingredient containing reservoir, and a means to prevent the activated carbon and/or another adsorbent from passing into the valve assembly when the pressurised dispensing carrier gas is released. On actuation, the dispensing carrier gas is released together with the ingredient, and the ingredient and dispensing carrier gas mix before exiting the dispenser.

19 Claims, 5 Drawing Sheets

(51) Int. Cl.

| | |
|---|---|
| ***B65D 83/32*** | (2006.01) |
| ***B65D 83/62*** | (2006.01) |
| ***B65D 83/66*** | (2025.01) |

(56) References Cited

U.S. PATENT DOCUMENTS

| | | | | |
|---|---|---|---|---|
| 4,049,158 | A * | 9/1977 | Lo | B65D 83/625 222/399 |
| 5,125,546 | A | 6/1992 | Dunne | |
| 8,746,503 | B2 | 6/2014 | Lim | |
| 9,387,911 | B2 | 7/2016 | Jamieson | |
| 2003/0015204 | A1 | 1/2003 | O'Shea | |
| 2006/0049215 | A1* | 3/2006 | Lim | B65D 83/663 222/402.1 |
| 2006/0049278 | A1 | 3/2006 | Hoshino | |
| 2008/0116228 | A1* | 5/2008 | Ryan | B65D 83/64 222/402.1 |
| 2023/0015204 | A1* | 1/2023 | Swaile | B65D 83/752 |

FOREIGN PATENT DOCUMENTS

| | | | |
|---|---|---|---|
| EP | 2327921 | A1 | 6/2011 |
| EP | 2431100 | A1 | 3/2012 |
| FR | 1567923 | A | 5/1969 |
| GB | 2510400 | A | 8/2014 |
| JP | 2004337582 | A | 12/2004 |
| JP | 2005008204 | A | 1/2005 |
| JP | 5162773 | B2 | 3/2013 |
| WO | 2008064293 | A2 | 5/2008 |

* cited by examiner

BAG ON VALVE TECHNOLOGY

CROSS-REFERENCE TO RELATED APPLICATIONS

This application is a continuation application of U.S. application Ser. No. 17/263,544 filed Jan. 26, 2021, which claims priority to International Patent Application No. PCT/IB2019/056330 filed Jul. 24, 2019, which also claims priority to Great Britain Application GB 1812298.6 filed Jul. 27, 2018, the contents of each of which is hereby incorporated by reference in its entirety.

TECHNICAL FIELD

This invention relates to improvements in a delivery technology referred to in the industry as bag-on-valve (BOV) technology and to a dispenser for use with novel valve assemblies. The dispenser, and method of delivery, utilise a dispensing carrier gas, typically an aerial gas, which is adsorbed on, typically, activated carbon.

BACKGROUND

The global bag on valve market was worth US$356.5 m in 2016 and is growing due to the rising awareness about its cost-effectiveness amongst consumers and manufacturers. Consumers are showing a strong inclination toward bag-on-valve technology as a packaging solution as it minimizes product wastage, thereby ensuring value for money. Thus, this technology is being used for several high-end products. Yet another noticeable benefit is the environmental benefits this technology brings, due to its airless bags and the method of packaging that separates the product and the propellant.

For the manufacturer, the preference for bag-on-valve promises a longer shelf life for oxygen sensitive products that contain fewer or no preservatives. Furthermore, various types of viscous and liquid products can be packaged using bag-on-valve technology, irrespective of the fact that they may be water or solvent-based. A growing number of manufacturers are also investing in this technology as the absence of propellant in the product reduces the risk of explosion or fire. Also, the efficient filling process is an additional advantage.

However, there are limitations and challenges resulting from the propellants used and the pressure drop during operation which, for example, preclude the complete emptying of the bag.

Legislation has been brought in to remove the high Global Warming Potential (GWP) of liquified gas propellants from aerosols.

The dispenser of the invention preferably uses aerial gases, particularly CO2 which means it has no GWP. This is because whilst the GWP of carbon dioxide is 1, it is derived from the atmosphere, and so the nett effect of using it is zero.

This contrasts with the new liquified gas propellants (such as HFO-1234ze) which have low GWP because they break down in the atmosphere within a short period of time. However, the breakdown products are pollutants.

Fluorocarbon-based propellants are subject to a never-ending cycle of regulatory change. However, aerial gases are exempt from legislation such as the REACH regulation.

Over the last 12 years in the UK there has been a reduction in VOC emissions of 30%. However, in that time, the emissions from aerosols has increased by 10% which is roughly in line with the increase in population size over this period. However, since 2005 the emissions from aerosols have grown from 4.7% to 7.9%(2017). The Government wants to reduce total VOC emissions by 38% by 2030 and BAMA (British Aerosols Manufacturing Association) want to develop plans to reduce VOC emissions in aerosols whilst maintaining the high levels of product performance, consumer acceptance and safety.

A reason for the continued use of fluorocarbon-based propellants is compressed aerial gases cannot be stored in a sufficient quantity to enable ingredients to be fully discharged from a bag on valve aerosol can.

Applicants use of activated carbon to enhance the gas storage volume enables the contents of normal sized pouches to be discharged in full.

Further, by avoiding the use of solvents and liquified gas propellants solvent abuse is mitigated.

Aerosols that use water as a solvent and compressed air propellants have poor (low force) performance and produce a wet spray with a low plume. In contrast the dispensers described herein produce an almost dry spray with good force and plume.

Additionally, whilst traditional aerosols are subject to dip-tube inversion, causing the release of excess propellant, the dispensers described herein avoid inversion problems.

Also, regular bag-on-valve technology does not enable the active ingredient in the bag to aerosolise whereas the dispensers described herein enable aerosolization (dispersal into an aerosol form).

Products available in the global market are aerosol BOV, standard BOV, and non-spray/low pressure BOV. Of these, the aerosol BOV is expected to acquire over 60% of the global market by the end of 2024.

The top four players are AptarGroup, Inc., Coster Tecnologie Speciali S.p.A, Toyo & Deutsche Aerosol Gmbh, and Summit Packaging System, Inc. These companies collectively held a share of about 39% in the global market in 2015.

The valve or valve assembly comprises either a male or female valve which is connected or crimped to a dispenser container or canister which is made of aluminium, tin plate, steel or plastics. Typical dispenser container capacity falls into one of the following size categories: below 30 ml, 30 ml-100 ml, 100 ml-275 ml, 275 ml-500 ml and above 500 ml.

Typical applications include applications for the following product types: Cosmetics & Personal Care products, e.g. deodorants and antiperspirants, Pharmaceutical products, Home Care products, e.g. air fresheners, cleaning preparations, Food & Beverage products e.g. cream and cheese, and Automotive & Industrial products e.g. paints.

These traditional bag-on-valve dispensers, like aerosol dispensers, normally contain one of two types of propellant.

i) Liquefied gas propellants, which are primarily hydrocarbon based (e.g. propane/n-butane/iso-butane blends); or ii) Hydrofluorocarbon based, (e.g. HFC-134a,-152a or HFO-1234ze).

The negative issues surrounding hydrocarbon propellants are well known, since these compounds are highly flammable, volatile organic compounds (VOC's) that are the subject of inhalation abuse and contribute to poor indoor air quality.

The hydrofluorocarbons are also replete with problems in aerosol applications, and HFC-134a, for example, has been recently legislatively phased out from use in many applications owing to its intrinsically high GWP.

Two condensed gas compounds that meet the new EU F-Gas Regulations for GWP<150 include:

HFC-152a (1,1-difluoroethane); and

HFO-1234ze (1,3,3,3-tetrafluoroprop-2-ene).

Unfortunately, HFC-152a (GWP~120) is designated as highly flammable, and HFO-1234ze (GWP~6) is conceded to be flammable above 28° C. It is also oftentimes prohibitively expensive.

Of course, where there is combustion of HFCs or HFOs there is also the release of hydrogen fluoride which is both very toxic and corrosive. Additionally, there is increased reporting of fluorinated hydrocarbon (HFC) abuse, particularly with HFC-152a, amongst young adults resulting in occasional deaths. It is too soon to report on the abuse of HFO-1234ze but there is every reason to assume that it will provide similar euphoric/asphyxiant properties to those of the HFCs. Finally, although there is only a small GWP contribution, the environmental breakdown of HFO-1234ze produces fluoroacetic acids which are toxic to plant and aquatic life. One of the atmospheric breakdown products of HFC-152a is carbonyl difluoride ($COF_2$) which hydrolyses in the lower atmosphere to give hydrogen fluoride.

Because of this it is desirable to avoid the use of such gases and to use compressed aerial gases where possible.

The development of a bag- and frit-on-valve assembly, as outlined herein, has many advantages and allows the use of non-harmful gases, e.g. aerial gases for dispensing a wide range of ingredients in a wide range of applications.

The benefits of, for example, aerial gases, such as air, nitrogen, oxygen, argon or carbon dioxide, arise from the fact they are cheap, readily available, and have low toxicity and are without risk of phase-out. These gases are also not amenable to regulation such as the REACH Regulation.

Unfortunately, aerial gases cannot be easily condensed without refrigeration, or the use of extreme pressures (below the respective critical temperatures) to provide gas in sufficient quantity for aerosol applications. Compression of these gases into dispenser containers is easily possible although the maximum, permitted pressure is limited such that the contents pressure does not exceed 15 barg when the canister and its contents are raised to the test temperature of 50° C. for 3 minutes, according to the Aerosols Directive. This restriction means that a canister must not be filled much above 12 barg at room temperature. Under such conditions, upon actuation, the pressure drops rapidly as the canisters' contents are discharged, and the overall gas volume delivery is small giving rise to a small number of delivered applications and poor customer perception.

By way of a non-limiting example, a standard air freshener employing a liquefied gas usually contains an ingredient (product concentrate) and a solvent in addition to the liquefied propellant; either hydrocarbon or HFC with all of the disadvantages as already described. Additionally, there is the possibility of product misuse resulting from dip-tube inversion giving a disproportionate loss of propellant. A standard, compressed air-based, air freshener, might thus contain 5% ethanol in water compressed with air in addition to the dissolved fragrance concentrate. Such devices tend to deliver a short, wet spray and although this system does not contain any liquefied gas propellant, it still contains solvent and exhibits poor performance.

In view of the shortcomings described for both liquefied gas-containing aerosols and for compressed gas-containing aerosols, it appears that an aerosol canister containing neither liquefied gas propellant nor solvent would be advantageous.

Whilst bag-on-valve technology enables the active product to be separated from the propellant (typically compressed air or nitrogen, or a condensed liquified gas), to maintain complete integrity of the product so that only pure product is dispensed, these standard bag-on-valves do not aerosolise because they do not release the propellant, but they can atomize the liquid products when sprayed.

In consequence their use is limited to, for example, the dispensation of liquids, including viscous liquids, solutions, lotions, creams, pharmaceutical preparations, gels, olive oil and other food products, such as processed cheese. As a consequence of being enclosed in a bag, the active ingredient is protected from oxygen contact which might otherwise cause the in product to spoil, and it is protected from contact with the propellant because the propellant is filled into the space occupied between the bag and the can.

Prior art, separate of traditional bag-on-valve dispensers, include art relating to adsorbent carbon technology such as Applicants own UK application no GB1703286.3 and WO 2014/037086, in which an aerial propellant gas is adsorbed onto activated carbon contained within a canister (in the space between the bag and the canister) which enables a more even dispensation of the contents of the bag compared to a compressed gas alone. Like the traditional bag-on-valve arrangements, no gas is discharged from the canister.

DE1817899 discloses a dispenser comprising a liquified gas propellant. A liquid to be atomised is contained in a bag located in the container and a double valve allows for a fluid flow circuit in which the liquid is atomised as it is sucked up by means of a venturi tube.

SUMMARY

In accordance with a first aspect of the present inventions there is provided a dispenser comprising a dispenser container filled with a dispensing carrier gas fitted with a valve assembly comprising i) a mounting cup;

ii) one or more gaskets;

iii) a valve seat;

iv) a spring;

v) a housing; and vi) a dip tube characterised in that the dispenser container is filled with activated carbon, or another adsorbent, an ingredient for dispensing is contained in an ingredient containing reservoir, and the ingredient containing reservoir is operatively connected to the dispenser container and the dip tube via first and second tubes such that on actuation of the valve assembly the ingredient and carrier dispensing gas travel along the first tube and the second tube respectively, and mix in the valve assembly before exiting the dispenser container via the actuator spray nozzle to an environment or subject; or the carrier dispensing gas travels along the second tube into the ingredient containing reservoir and carries the ingredient along the first tube where they mix in the valve assembly before exiting the dispenser container via the actuator spray nozzle to an environment or subject.

In one embodiment the dip tube of the valve assembly divides into the first and second tubes which are seated within the dispenser container. The first tube is connected to the ingredient containing reservoir allowing the ingredient to be dispensed on actuation of the valve. The second tube comprises a frit or filter to prevent activated carbon passing into the tube when the pressurised dispensing carrier gas is released.

Preferably the ingredient containing reservoir is a bag or pouch.

In another embodiment the dip tube of the valve assembly is connected to the ingredient containing reservoir or container via a lid comprising first and second connectors. The first connector connects to the first tube which connects the valve assembly to the ingredient containing reservoir, and the second connector connects the second tube, comprising a frit or filter which prevents activated carbon passing into the tube to the ingredient containing reservoir, thus enabling the pressurised dispensing carrier gas to drive the ingredient out of the ingredient containing reservoir upon actuation.

In this embodiment the ingredient containing reservoir comprises an open container, filled with a sublimable ingredient or an ingredient absorbing material onto which the ingredient is absorbed which container is closed by the lid.

The dispenser may comprise three or more tubes and at least two ingredient containing reservoirs comprising different ingredients.

The dispenser may further comprise a metering device.

The dispenser may further comprise a spacer.

The dispenser is preferably filled with a dispensing gas which is nitrous oxide or an aerial gas, such as air, nitrogen, oxygen, carbon dioxide or argon.

Most preferably the aerial gas is carbon dioxide since it is the gas that is most effectively absorbed by the activated carbon.

A benefit of the invention is that it is able to dispense an ingredient absent of a liquified propellant and/or a solvent.

The active ingredient may include any ingredient used in the cosmetics & personal care, pharmaceutical, home care, food & beverage and automotive & industrial sectors, including particularly, but not exclusively, a fragrance, flavour, pheromone, pesticide, medicinal, nutraceutical or pharmaceutical ingredient.

In the case of medicines and pharmaceuticals it is essential that a constant dose is delivered, and thus the dispenser is further adapted to deliver a metered dose and may additionally comprise a spacer.

In accordance with a second aspect of the present invention there is provided a method of delivering an ingredient from a dispenser of the invention having a valve assembly as per the fourth aspect of the present invention wherein the ingredient is released from an ingredient containing reservoir under pressure together with a dispensing carrier gas which is also released on actuation of the valve assembly which ingredient and carrier gas travel along the first tube and the second tube respectively and are mixed before being delivered from the dispenser to an environment or subject.

In accordance with a third aspect of the present invention there is provided a method of delivering an ingredient from a dispenser of the present invention having a valve assembly as per the fifth aspect of the present invention wherein the ingredient is released from an ingredient container under pressure together with a dispensing carrier gas which is also released on actuation of a valve assembly, which carrier dispensing gas travels along the second tube into the ingredient container and carries the ingredient along the first tube where they mix in the valve assembly before exiting the dispenser via an actuator spray nozzle to an environment or subject.

In one embodiment mixing effectively commences in the valve assembly, whereas in another embodiment mixing commences as the carrier gas passes through the ingredient container.

According to fourth aspect of the present invention there is provided a valve assembly for a dispenser comprising:

i) a mounting cup;
ii) one or more gaskets;
iii) a valve seat;
iv) a spring;
v) a housing; and
vi) a dip tube, which divides into at least two tubes seated within a dispenser container, characterised in that a first tube, seated within the dispenser container, is connected to an ingredient containing reservoir, allowing the ingredient to be dispensed on actuation of the valve, and a second tube comprises a frit or filter to prevent activated carbon passing into the second tube when a pressurised dispensing carrier gas is released.

In a preferred embodiment the ingredient containing reservoir is a bag or pouch.

In accordance with a fifth aspect of the present inventions there is provided a valve assembly for a dispenser comprising:

i) a mounting cup;
ii) one or more gaskets;
iii) a valve seat;
iv) a spring;
v) a housing; and
vi) a dip tube, characterised in that the dip tube is connected to an ingredient containing reservoir via a lid comprising first and second connectors, the first connector connecting a first tube which connects the dip tube to the ingredient containing reservoir, and a second tube comprising a frit or filter which prevents activated carbon passing into the second tube and enables a pressurised dispensing carrier gas to drive the ingredient out of a dispenser container upon actuation.

In this alternative embodiment the ingredient containing reservoir may contain an ingredient absorbing material, such as a wickable material, for example a fabric. The ingredient absorbing material is retained in an ingredient holding container closed by a lid, and the ingredient may be dissolved in a carrier liquid and is absorbed by the absorbing material.

Alternatively, the ingredient holding container may be filled with a sublimable solid.

Preferably, though not essentially, the frit or filter on the second tube is seated above a level to which the activated carbon is filled within the dispenser container.

In all embodiments the valve assembly further comprises an actuator.

In yet another embodiment the valve assembly comprises three or more tubes and at least two ingredient containing reservoirs comprising different ingredients.

A preferred ingredient is a fragrance and the product an air freshener. Other preferred ingredients include deodorisers and antiperspirants, hairsprays, polish cleaners and emulsions.

In a favoured embodiment, particularly for the delivery of pharmaceutical or medicinal ingredients, the valve assembly further comprising a metering device and optionally a spacer.

According to a sixth aspect of the present invention there is provided a dispenser comprising a dispenser container filled with activated carbon and a dispensing carrier gas fitted with a valve assembly according to the fourth or fifth aspect of the invention.

The activated carbon is added in an amount that allows for the ingredient containing bag(s) to be filler. Typically, the amount will be from 15-65% by volume, more typically 25 to 45% by volume, of the dispensing container depending on the size of the bag(s).

Also, in order to control spray performance a pressure of between 4 and 10 barg, and more preferably 6 to 8 barg is preferred.

Flow of the dispensing gas and ingredient may also be controlled by fitting a reducer in the actuator or by judicious selection of a valve restrictor orifice. Indeed, it may be desirable to use different diameter tubes/valve orifices to control the ratio of ingredient: dispensing gas flow. Generally, ensuring a greater flow of the dispensing gas to liquid will result in a drier plume.

Obviously, the discharge rate will vary with the ingredient but for many consumer goods it is desirable to have a discharge rate in the range 0.2 to 0.5 g/s.

In some cases, it may also be desirable to include a small proportion of an entraining agent with the dispensing gas.

BRIEF DESCRIPTION OF THE DRAWINGS

Embodiments of the invention are further described hereinafter with reference to the accompanying drawings, in which.

DETAILED DESCRIPTION

Figure 1A:
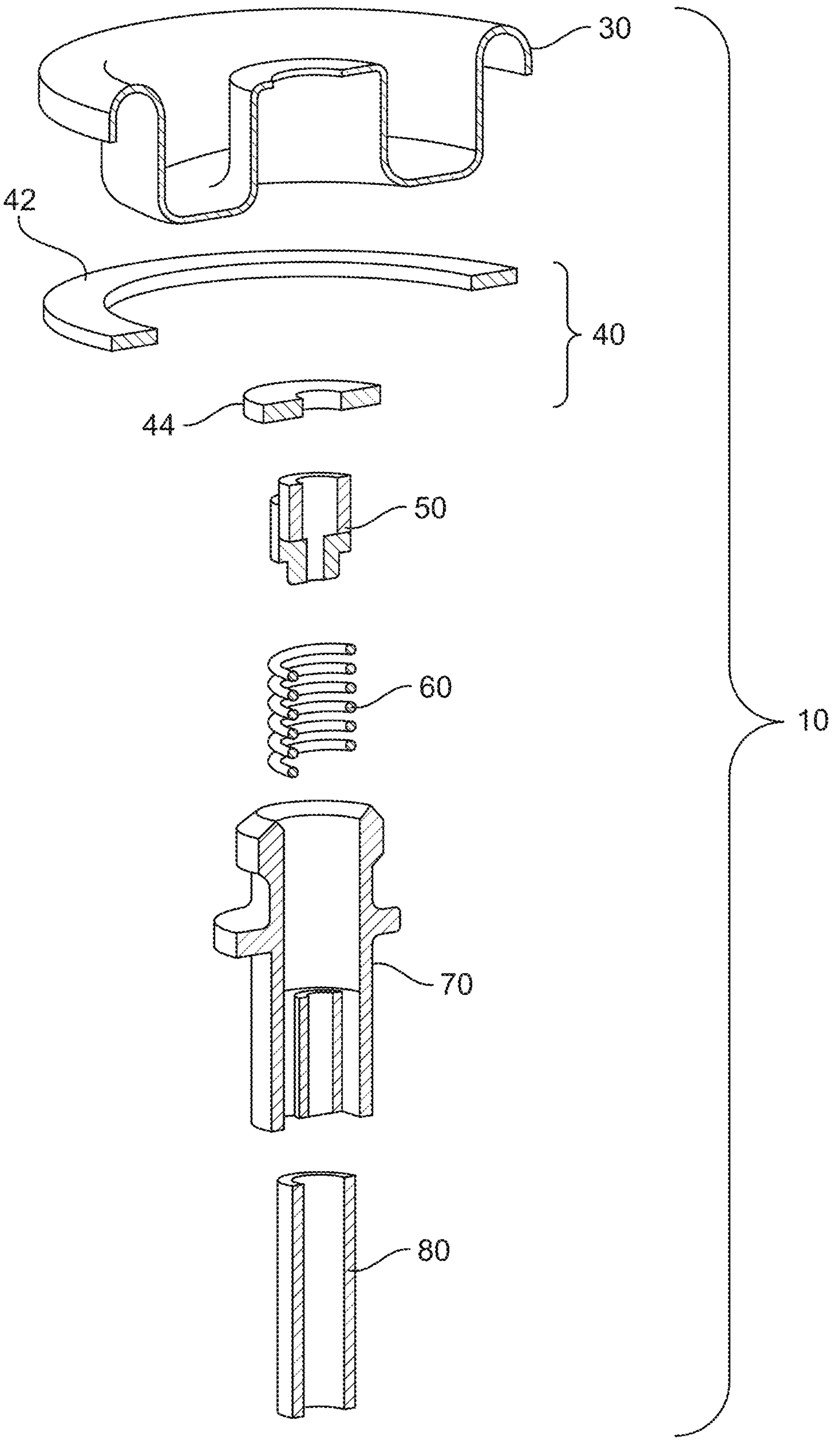
FIG. 1A is an exploded view of a prior art male (single) bag on valve assembly.
Figure 1B:
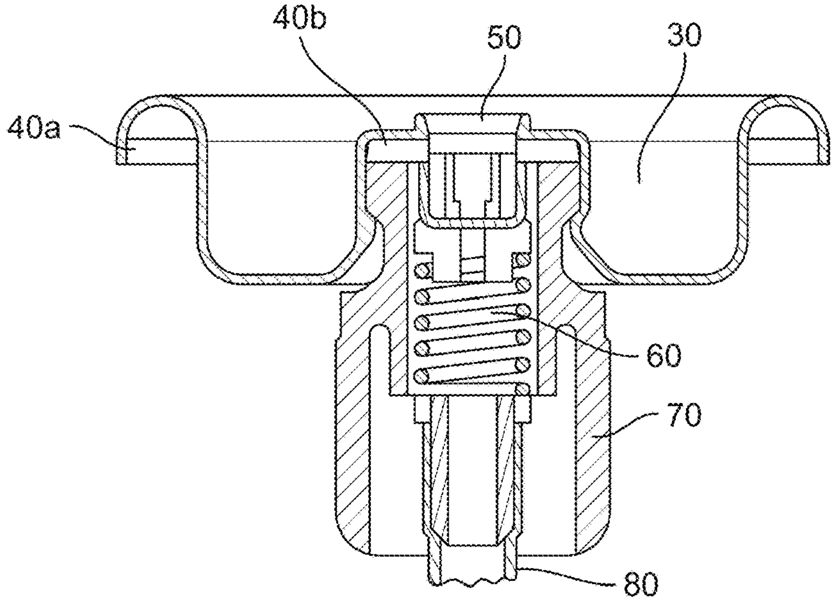
FIG. 1B is a cross sectional view of the assembled valve assembly of FIG. 1A.

Referring to FIG. 1 a typical bag on valve assembly (10) comprises:

i) a mounting cup (30);
ii) an outer (42) and inner (44) gasket (40);
iii) a valve seat (50);
iv) a spring (60);
v) a housing (70); and
vi) a dip tube (80) with a fitment, such as a rib, to which a bag (not shown) is attached.

Various actuators (200) may be connected to the valve assembly (10) which may be a male valve (as illustrated) or a female valve.

In a variation to the single bag arrangement two companies, Lindal Group (Bi-valve) and Toyo Aerosol industry (Dual) have developed a dispensing system in which two bags are filled, allowing two different products to be dispensed, either as separate products, or more typically as a single product, with mixing occurring in the valve assembly. In the latter case the valve assembly has a dip tube (80) which splits/bi-furcates into two, each with fitments for connecting a bag thereto. The bags are typically 3 layer, or 4 layer, pouches made respectively of polyacrylate/aluminium/polypropylene or polyethylene (PA/ALU/PP or PE) or polyethylene terephthalate/aluminium/orientated polyamide/polypropylene or polyethylene (PET/ALU/OPA/PP or PE).

Figure 2A:
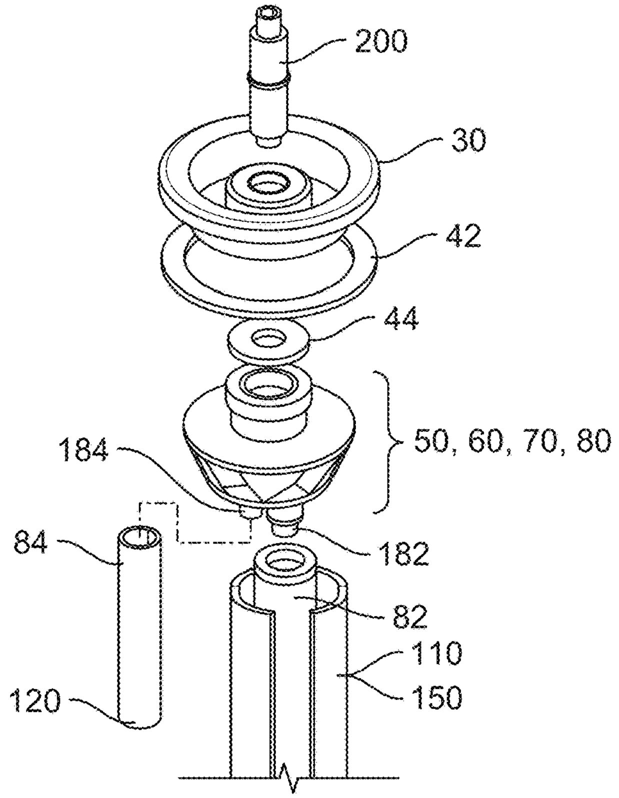
FIG. 2A is an exploded view of a first embodiment of a valve assembly of the present invention.
Figure 2B:
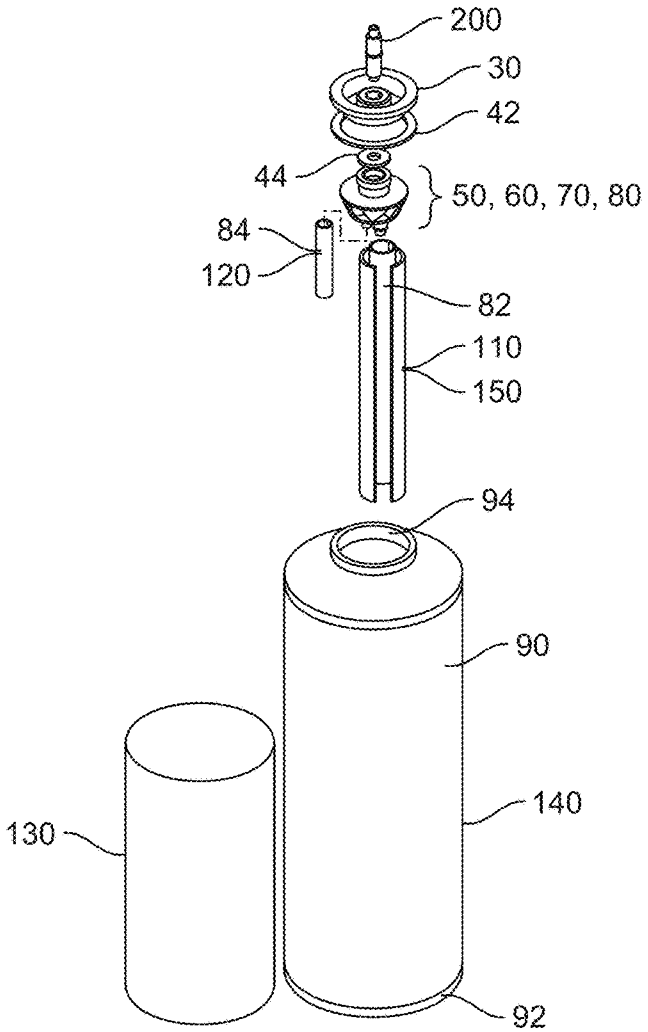
FIG. 2B is an exploded view of a first embodiment of a dispenser comprising the valve assembly of FIG. 2A.

In contrast to the prior art, the valve assembly (10) according to the first aspect of the invention (as best illustrated in FIGS. 2A and 2B, has a mounting cup (30), a pair of gaskets (42 and 44), a valve seat (50), spring (60) and housing (70), with a dip tube (80) which divides, at its lower end, to receive two tubes (82; 84) on respective fitments (182; 184). An ingredient (100) containing reservoir (110) or bag or pouch (150) is connected to a first tube (82) and a frit or filter (120) is connected to a second tube (84), and acts to prevent fine particles of activated carbon being dispensed. Both tubes extend into dispenser container (90), which is filled with a dispensing carrier gas (140), typically carbon dioxide, which is adsorbed by activated carbon (130) which fills or partially fills the dispenser container (90). On actuation, the dispensing carrier gas (140) is released together with the ingredient (100) stored in the bag (150), and the ingredient (100) and carrier gas (140) mix as they pass through the valve assembly (10) to exit the dispenser container via the actuator spray nozzle (200).

Figure 2C:
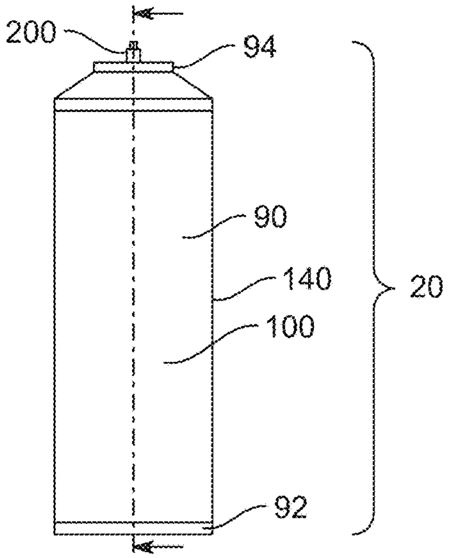
FIG. 2C is a side elevation of the assembled dispenser of FIG. 2B.
Figure 2D:
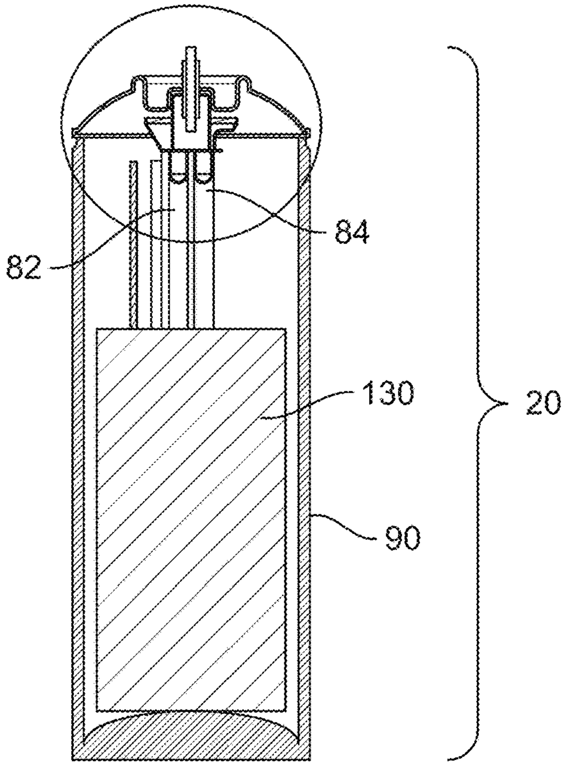
FIG. 2D is a cross sectional view of the dispenser of FIG. 2B.
Figure 2E:
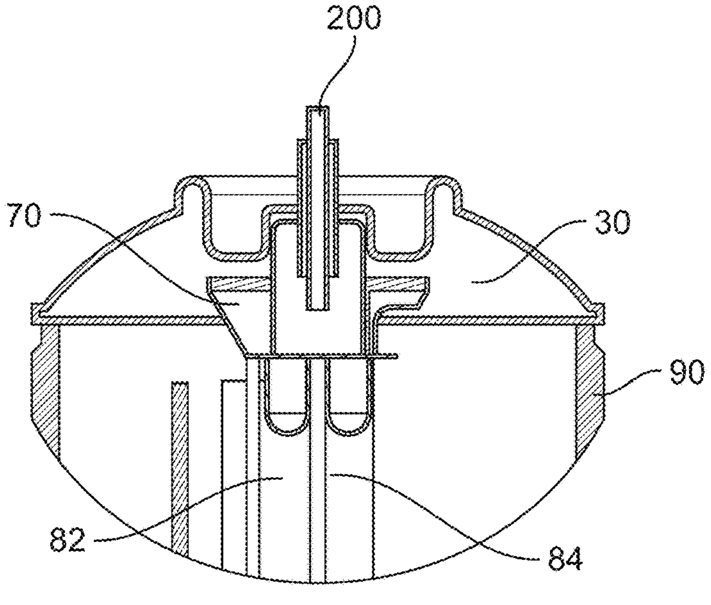
FIG. 2E is a detailed view of the encircled area of FIG. 2D.

The dispenser (20) illustrated in FIG. 2D, comprises a dispenser container or cannister (90) (FIG. 2B) which is filled or partially filled with activated carbon (130) and the valve assembly (10) is crimped, or otherwise sealed, to close the opening (94) (FIG. 2B) of the dispensing cannister (90). The dispenser (20) may be charged with a dispensing carrier gas (140) before or after crimping or otherwise sealing, as disclosed in, for example UK application no GB1703286.3 incorporated by reference. Similarly, the bag or pouch (150) may be filled with its ingredients (100) before or after crimping.

The filled dispenser (20) is substantially as illustrated in FIGS. 2C and 2D.

The invention enables, for example, essential oils/fragrances to be rapidly mixed by vaporisation/atomisation due to contact with a high velocity gas stream.

The active ingredient (100) is usually in the form of a liquid or oil, but could be any mobile phase carrying the active ingredient The bag or pouch (150) is usually rolled into a hollow cylinder (See FIG. 2B) around first tube (82) for ease of insertion, and the adjoining second tube (84) and frit (120) are inserted into a canister pre-filled with granular activated carbon (130), first and second tubes (82) and (84) being connected to the valve assembly via connectors (182) and (184) respectively. (The granular carbon is easily displaced to accommodate the rolled-up bag which is now surrounded by the activated carbon granules). The canister (90) is then crimped, and the bag side of the canister is filled with the required quantity of active ingredient (100). The frit side of the valve is then filled with pressurised gas (usually, air, oxygen, nitrogen or carbon dioxide). On actuating the valve, the assembly enables the dispensing carrier gas (140), that is mixed or physically saturated, at least in part, with any active ingredient(s), for example, a fragrance for air freshening applications, a drug, or an insecticide. Where the dispensing gas is air or oxygen it is possible to provide a scented air or oxygen, mild enough to breathe. Filling the bag (150) with a medicinal preparation (such as plant oil or an active therefrom) and using the dispensing gas (140) allows for the use as a medical inhaler, optionally fitted with a dose regulator and spacer.

Example 1

An aluminium canister (90) (173×53 mm) with an internal volume of 330 ml was filled with a high activity activated carbon (130) (approximately 120 g) and dry ice (140) (57.5 g). The canister was shaken to distribute the mix. A bag- and frit-on-valve assembly (10) as per the first aspect of the invention was taken and 20 ml of pure fragrance oil (100) was added to the bag (150). The bag was inserted into the canister (90) by manipulating it through the activated carbon granules and the canister was crimped to the valve assembly (10) to form a dispenser (20).

The dispenser (20) and its contents was allowed to warm to room temperature. The quantity of carbon dioxide generated a pressure of 12 barg. (Without the activated carbon, it was calculated that the pressure of carbon dioxide in this volume would be equivalent to 54 barg, corresponding to 31 litres of gas).

When the dispenser (20) was actuated an almost dry spray was generated producing a strong and persistent odour. Because the device does not require a solvent, the fragrance is in a concentrated form, and there is no need to identify a compatible solvent. The actuator (200) can be in any design that permits the required amount of scent (or other active component) to be delivered.

Figure 3A:
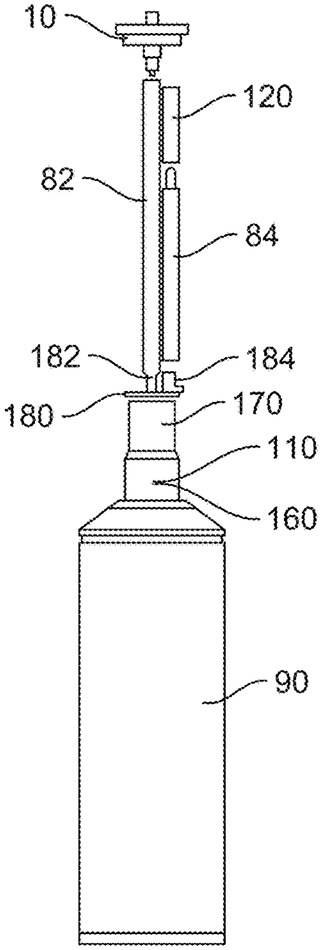
FIG. 3A is an exploded view of a second embodiment of a dispenser comprising an alternative valve assembly.
Figure 3B:
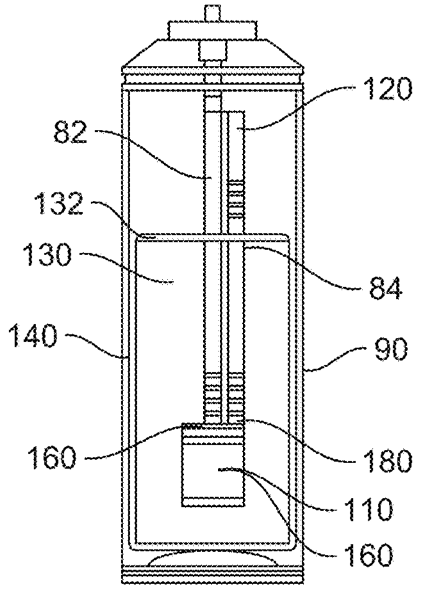
FIG. 3B is a cross sectional view of the second embodiment of dispenser.

In an alternative design (FIG. 3A and FIG. 3B) the bag (150) is replaced with an ingredient containing container (160), and optionally an absorbent material (170) and closed with a lid (180) comprising two connectors (182) and (184), which connect to first tube (82) and second tube (84), respectively.

The container (160) is connected to the valve assembly (20) via a long tube (82), such that the container (160) is disposed towards the base (92) of the cannister (90). A second tube (84), with a frit (120) on its end, which is ideally, but not essentially, seated above the carbon (130) fill line (132), allows the dispensing gas (140) to pass along tube (84) and into container (160) where it carries ingredient (110) along tube (82) into the valve assembly (10) such that it can leave the cannister (90) via the actuator spray nozzle (200). The container (160) may include an absorbent pad (170) that is soaked in the liquid ingredient (110) of choice. Alternatively, the container (160) may house a sublimable solid, such as menthol crystals or camphor. The container (160) and tubes (82; 84) are inserted into the canister (90), connected to the valve assembly (10), pre-filled with granular activated carbon (130) and the canister (90) is gassed under the mounting cup (30) with the aerial gas (140) (preferably, but not limited to, carbon dioxide). The mounting cup (30) is then crimped onto the canister (90). On actuation of the valve, the assembly allows for the saturation of the gas with the fragrance or other ingredient, which is then dispensed into the room or to a subject, without the accompaniment of either solvent or liquefied propellant.

Although this assembly allows for the vapour of the fragrance or other ingredient to diffuse and potentially contact the activated carbon the following example shows that the diffusion of e.g. limonene is very much limited: —

Example 2

Using limonene (molecular mass=136.2 g/mole, boiling point=176° C.) as an example, for which the saturation vapour pressure at 25° C. is 2 mm Hg.

At an average can pressure of 5 atmospheres (5.07 bar), the concentration of limonene vapour is:—

760×2/5=5.3E-4⇒5.3E-4×136.2 g/mol-0.072 g limonene/mol gas=0.072/24=3.0E-3 g limonene/litre of gas=3 g limonene/$m^3$ of gas.

Applying Fick's law: F=D A Δc/L

Where: F=diffusion flow rate, D=diffusion coefficient, A=tube cross sectional area (diameter=4 mm), c=vapour concentration, L=tube length (10 cm).

Hence, F=$1\times10^{-7}$ $m^2$ $s^{-1}\times12.6\times10^{-6}$ $m^2\times3$ g/$m^3\times1/0.1$ m=$3.6\times10^{-11}$ g/s=0.001 g/year.

The diffusion rate of the limonene onto the activated carbon under these conditions is therefore only 0.001 g/year.

The invention claimed is:

1. A dispenser comprising: a dispenser container and a valve assembly comprising a valve connected to the dispenser container, wherein:

a) the dispenser container is at least partially filled with activated carbon and/or another adsorbent and a dispensing carrier gas, b) an ingredient is contained in an ingredient containing reservoir, and c) the valve assembly comprises an upper end of which is in operative communication with an actuator spray nozzle, and a lower end connected to the ingredient containing reservoir, and a means to prevent the activated carbon and/or another adsorbent from passing into the valve assembly when the pressurised dispensing carrier gas is released;

such that on actuation, the dispensing carrier gas is released together with the ingredient, and the ingredient and dispensing carrier gas mix before exiting the dispenser.

2. The dispenser as claimed in claim 1, further comprising a dip tube comprising a first tube and a second tube arranged offset radially to one another, wherein the dip tube is operatively connected to the ingredient containing reservoir and the dispenser container such that on actuation of the valve assembly the ingredient and dispensing carrier gas travel along the first tube and the second tube respectively, and mix before exiting the dispenser.

3. The dispenser as claimed in claim 2, wherein the dispensing carrier gas travels along the second tube into the ingredient containing reservoir and carries the ingredient along the first tube where they mix.

4. A method of delivering an ingredient from a dispenser as claimed in claim 3, wherein the ingredient is released from the ingredient containing reservoir under pressure together with the dispensing carrier gas which is also released on actuation of the valve assembly which dispensing carrier gas travels along the second tube into ingredient containing reservoir and carries the ingredient along the first tube where they mix before exiting the dispenser via the actuator spray nozzle to an environment or subject.

5. The dispenser as claimed in claim 2, wherein the dip tube is connected to the ingredient containing reservoir or container via a lid, the first fitment connects to the first tube and connects the valve assembly to the ingredient container, and the second fitment connects to the second tube, comprising the means which prevents activated carbon from passing into the dip tube, and into the ingredient containing reservoir, thus enabling the pressurised dispensing carrier gas to drive the ingredient out of the ingredient containing reservoir upon actuation.

6. The dispenser as claimed in claim 5, wherein the ingredient containing reservoir comprises an open container, at least partially filled with a sublimable ingredient and/or an ingredient absorbing material onto which the ingredient is absorbed, which open container is closed by the lid.

7. A method of delivering an ingredient from a dispenser as claimed in claim 2, wherein the ingredient is released from the ingredient containing reservoir under pressure together with the dispensing carrier gas which is also released on actuation of the valve assembly which ingredient and dispensing carrier gas travel along the first tube and the second tube respectively and mix before exiting the dispenser.

8. The dispenser as claimed in claim 1, wherein the ingredient containing reservoir is a bag or pouch.

9. The dispenser as claimed in claim 1, further comprising a spacer.

10. The dispenser as claimed in claim 1, wherein the dispensing carrier gas is chosen from nitrous oxide, nitrogen, oxygen, carbon dioxide, argon, or mixtures thereof.

11. The dispenser as claimed in claim 10, wherein the arial dispensing carrier gas is carbon dioxide.

12. The dispenser as claimed in claim 1, which is absent of a liquified propellant and/or a solvent.

13. The dispenser as claimed in claim 1, wherein the active ingredient is chosen from a fragrance, flavour, pheromone, pesticide, nutraceutical, pharmaceutical, or mixtures thereof.

14. A method of delivering an ingredient from a dispenser as claimed in claim 1, wherein the dispensing carrier gas is released together with the ingredient, and the ingredient and dispensing carrier gas mix before exiting the dispenser.

15. A valve assembly, for a dispenser at least partially filled with activated carbon and/or another adsorbent and a dispensing carrier gas, comprising: a component comprising a tube, an upper end of which is in operative communication with an actuator spray nozzle, and a lower end of which divides into first and second fitments which receive respectively first and second tubes; the first tube, seated within the dispenser, is connected to an ingredient containing reservoir allowing the ingredient to be dispensed on actuation of the valve assembly, and the second tube comprises a frit or filter; and wherein on actuation, the ingredient and the dispensing carrier gas mix as they pass through the valve assembly.

16. The valve assembly as claimed in claim 15, wherein the ingredient containing reservoir is a bag or pouch.

17. The valve assembly as claimed in claim 15, wherein the ingredient containing reservoir is a container closed with a lid.

18. The valve assembly as claimed in claim 15, wherein the first and second fitments are arranged offset radially from and below the tube.

19. The valve assembly as claimed in claim 15, wherein the component comprises a valve housing.

* * * * *